United States Patent
Tuoriniemi et al.

(10) Patent No.: US 6,731,267 B1
(45) Date of Patent: May 4, 2004

(54) SINGLE TOUCH DUAL AXIS INPUT DEVICE

(76) Inventors: Veijo Matias Tuoriniemi, 210 E. 17th St. Apt. 4D, New York, NY (US) 10003-3629; Cornelia Frances Tuoriniemi, 210 E. 17th St. Apt. 4D, New York, NY (US) 10003-3629

( * ) Notice: Subject to any disclaimer, the term of this patent is extended or adjusted under 35 U.S.C. 154(b) by 0 days.

(21) Appl. No.: 09/525,502

(22) Filed: Mar. 15, 2000

Related U.S. Application Data (63) Continuation of application No. PCT/US98/19010, filed on Sep. 14, 1998.
(60) Provisional application No. 60/058,934, filed on Sep. 15, 1997.

(51) Int. Cl.$^7$ .................................................. G09G 5/00
(52) U.S. Cl. ....................................... 345/156; 345/169
(58) Field of Search ................................. 345/156, 169, 345/163, 158

(56) References Cited

U.S. PATENT DOCUMENTS

| | | | |
|---|---|---|---|
| 3,541,541 A | 11/1970 | Engelbart | |
| 4,561,049 A | 12/1985 | Deleganes et al. | |
| 4,712,101 A | * 12/1987 | Culver | 345/157 |
| 4,799,049 A | 1/1989 | Avila | |
| 4,910,503 A | 3/1990 | Brodsky | |
| 4,937,564 A | 6/1990 | Oberg | |
| 5,095,303 A | * 3/1992 | Clark et al. | 345/164 |
| 5,126,723 A | 6/1992 | Long et al. | |
| 5,235,868 A | 8/1993 | Culver | |
| 5,277,429 A | * 1/1994 | Smith, III | 463/10 |
| 5,436,954 A | 7/1995 | Nishiyama et al. | |
| 5,440,325 A | 8/1995 | Edmark | |
| 5,446,481 A | 8/1995 | Gillick et al. | |
| 5,448,240 A | 9/1995 | Morito | |
| 5,473,344 A | * 12/1995 | Bacon et al. | 345/157 |
| 5,479,190 A | 12/1995 | Rowe | |
| 5,479,192 A | 12/1995 | Carrol et al. | |
| 5,530,455 A | * 6/1996 | Gillick et al. | 345/156 |
| 5,563,631 A | * 10/1996 | Masunaga | 345/161 |
| 5,627,531 A | 5/1997 | Posso et al. | |
| 5,631,669 A | 5/1997 | Stobbs et al. | |
| 5,635,926 A | * 6/1997 | Li | 341/20 |
| 5,652,603 A | 7/1997 | Abrams | |
| 5,687,080 A | * 11/1997 | Hoyt et al. | 345/161 |
| 5,721,566 A | 2/1998 | Rosenberg et al. | |
| 5,794,164 A | * 8/1998 | Beckert et al. | 455/3.06 |
| 5,808,602 A | 9/1998 | Sellers | |
| 5,818,427 A | 10/1998 | Stromberg | |

(List continued on next page.)

FOREIGN PATENT DOCUMENTS

| | | |
|---|---|---|
| EP | 0463856 B1 | 6/1991 |
| EP | 0715441 A1 | 6/1996 |
| EP | 0755142 A2 | 1/1997 |
| EP | 0845893 A2 | 6/1998 |
| JP | 60-235227 | 11/1985 |

OTHER PUBLICATIONS

IBM Technical Disclosure Bulletin vol. 21 No. 7 Dec. 1978 pp. 3024–3027.

*Primary Examiner*—Richard Hjerpe
*Assistant Examiner*—Kevin M. Nguyen
(74) *Attorney, Agent, or Firm*—Charles E. Bruzga

(57) ABSTRACT

A finger actuated display peripheral interface input device having a first axis roller for inputting positional information for a first axis and coupled to a transducer for producing a first signal indicative of the rotation of said first axis roller. A second axis roller and transducer is used for inputting positional information for a second axis and produce a second signal indicative of the rotation of said second axis roller. A first switch is adapted to produce a first switch signal upon actuation of said first switch. Both of the rollers can be rotated simultaneously or selectively. The miniature size rollers are located so close to each other that both axis rollers can be rotated simultaneously by a touch a finger pad of a distal phalanx of one finger to simultaneously change positional information in said first and second axes.

21 Claims, 11 Drawing Sheets

U.S. PATENT DOCUMENTS

| | | | |
|---|---|---|---|
| 5,825,353 A | * 10/1998 | Will | 345/184 |
| 5,883,612 A | * 3/1999 | Kreitzer | 345/619 |
| 5,892,503 A | * 4/1999 | Kim | 341/22 |
| 6,046,728 A | * 4/2000 | Hume et al. | 345/157 |
| 6,215,473 B1 | * 4/2001 | Suzuki | 345/156 |
| 6,256,011 B1 | * 7/2001 | Culver | 345/156 |
| 6,397,084 B1 | * 5/2002 | Wicks et al. | 379/433.04 |
| 6,429,846 B2 | * 8/2002 | Rosenberg et al. | 345/156 |

* cited by examiner

SINGLE TOUCH DUAL AXIS INPUT DEVICE

This is a continuation application of PCT application no. PCT/US98/19010 filed on Sep. 4, 1998. By virtue of the foregoing PCT application, this application claims priority from U.S. Provisional Application No. 60/058,934 filed Sep. 15, 1997.

BACKGROUND

1. Field of Invention

This invention relates to display interface input device, particularly with rollers. Input device can be used to point to and select objects on a display screen of, e.g., a computer, TV, cellular telephone, car radio or a function control device for a car. It can be used without a display screen but with other sensory feedback such as audio.

2. Description of Prior Art

Prior art shows different pointing devices like mouse, track ball, stylus, wobble plate, wiggle stick, and touch panel to move cursor on display and make selections. Neither of them has solved the problem of portability or sensitivity. Stationary mouse is dependent on flat, planar operating surface.

Apple Isopoint (TM) unit has been used in laptop computers. The Isopoint (TM) system has a cylinder mounted below space bar. The cylinder rotates axially and slides longitudinally. Device takes space and making a straight line is difficult. Straight lines is especially important when using a pointing devise in graphic programs.

Track ball devisee's cursors tend to wiggle instead of moving straight. This is especially annoying if user wants to draw straight horizontal or vertical lines. Unfortunately during rotation when users thumb reaches trackball's side the contact with the ball disappears and users thumb drops off the ball. This unwanted feature usually causes sudden movement of the track ball and operation has to be started again from the beginning.

In touch pads, wiggle stick, wobble plates and inertial mice cursor movement operate electrically. Cursor is moved in standard predetermined speed over the screen. These devices usually lack the sensitivity of mechanically connected mouse. Cursor is difficult to place over an icon. Cursor travels over objects and user has to make several correctional movements before desired cursor position is reached. A touch panel takes valuable space and tend to be sensitive to dirt, moisture and oils.

Touch screen pointing pen devises are used in handheld computers. Because of additional touch sensitive layers in front of the screen the screen looks darker than standard displays.

In U.S. Pat. No. 5,631,669 issued to Stobbs et al. mouse with a microphone is disclosed. This mouse is dependent on mouse matt and flat table top and cursor cannot be moved when the mouse is in hand. In order to move cursor Stobbs mouse has to be placed on flat surface.

DRAWING FIGURES

In the drawings, closely related figures have the same number but different alphabetic suffixes.

| List of Reference Numerals | |
|---|---|
| 10 | housing of the input device |
| 12 | shaft |
| 14 | first axis roller |
| 16 | axle |
| 17 | support roller |
| 18 | second axis roller |
| 19 | ball |
| 20 | select button |
| 21 | ball collar |
| 22 | cord |
| 23 | roller bed |
| 24 | connector |
| 26 | microphone |
| 28 | circuit board |
| 29 | snapfit fixture |
| 30 | encoder wheel |
| 31 | hinge |
| 32 | roller shaft support |
| 33 | snapfit closure |

-continued

List of Reference Numerals

| | |
|---|---|
| 34 | axle |
| 36 | gear |
| 38 | Light emitting element, LED |
| 39 | light reflecting element |
| 40 | phototransistor |
| 42 | hole |
| 44 | first select switch |
| 46 | spring |
| 48 | additional select switch |
| 50 | additional circuitry |
| 52 | ball bearings |
| 56 | display |
| 58 | gear |
| 60 | gear |
| 62 | select switch |
| 64 | axle support |
| 66 | hand |
| 68 | cursor |
| 70 | structured surface |

SUMMARY

In accordance with the present invention a dual axis display input device having a first and a second axis rollers located so close that both axis rollers can be rotated simultaneously by one finger touch to simultaneously change positional information in along first and a second axes.

Description of the First Embodiment

Figure 2:
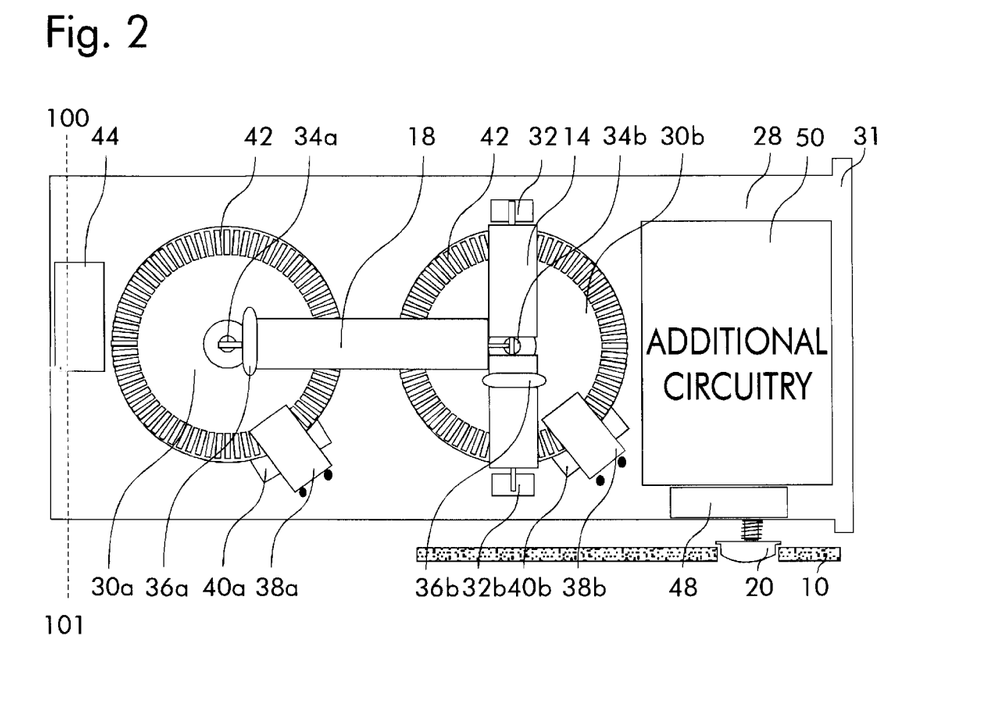
FIG. 2 shows a top cross sectional view of a input device with T-type roller positioning.
Figure 3:
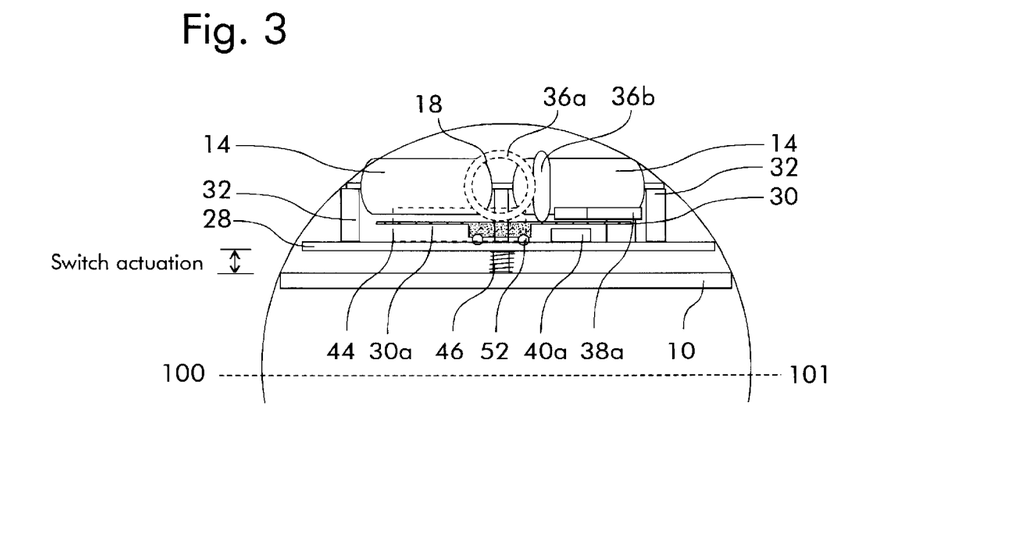
FIG. 3 shows a cross sectional view of a FIG. 2.

Referring to FIGS. 2 and 3, FIG. 2 shows a top cross sectional view of a dual-touch roller cursor mark positioning device circuit board.

Intention is to provide a space saving way to manufacture a input device. Prior art devices have encoder wheels standing up on a circuit board. Thin encoder wheels 30 of this invention are laying flat against the circuit board allowing mounting in flat housings.

Figure 1A:
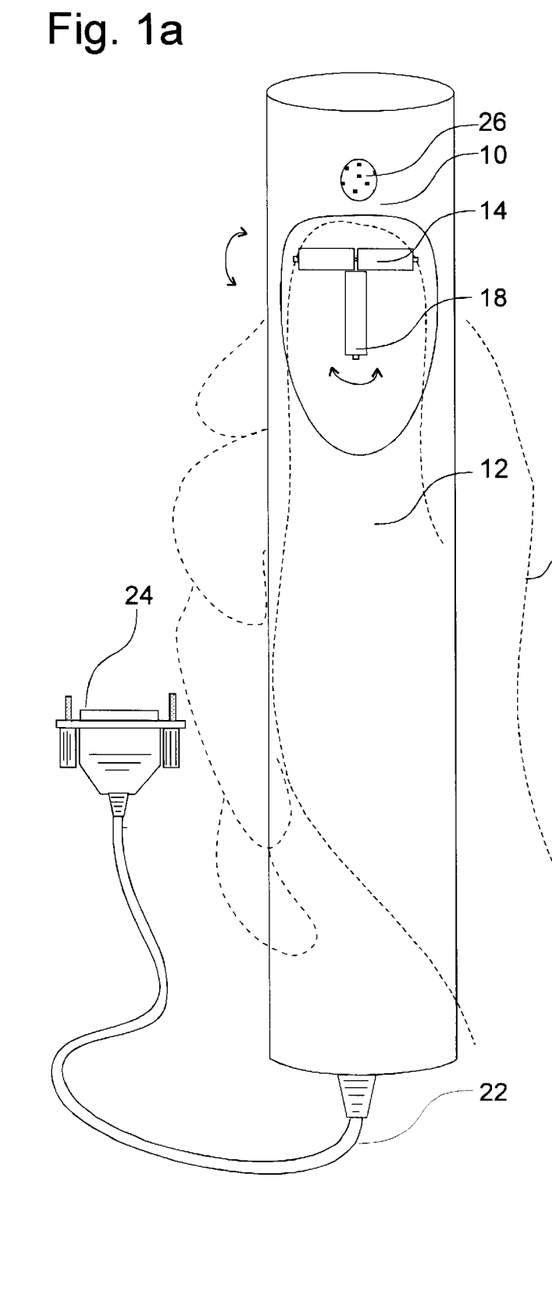
FIG. 1a shows a perspective view of input device embedded to a hand held housing.
Figure 1B:
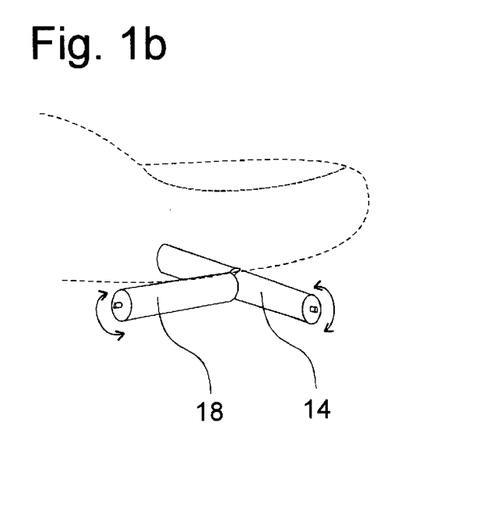
FIG. 1b shows a perspective view of input device rotated by a finger.

In this embodiment the first axis roller 14 and second axis roller are rotably fixed to a circuit board 28 User can easily move both rollers simultaneously for diagonal movements and regulate the angle of cursor movement on the screen by sliding the thumb in different angles over the joint of the roller. Rollers 14 and 18 are positioned transverse each other, preferably orthogonal to each other in a "T" shape as shown in FIG. 1, so that both rollers can be manipulated by a single touch (e.g. with a single finger). More specifically, as FIG. 1a shows, both rollers can be rotated simultaneously by a touch of a finger pad of a distal phalanx of one finger, for instance, the finger pad of the thumb shown in Fib. 1a in dotted lines that cover both rollers 14 and 18. The rollers can also assume other transverse positions, such as forming a "V", "L" or "X" shape. Pure horizontal and vertical movements can be performed by moving only one roller and leaving the other one untouched.

In this embodiment the first axis roller 14 is placed at 90 degree angle against the second axis roller 18. Roller 14 has two thicker portions providing a touch area. Thinner part in the middle of the axis roller 14 is resting on a encoder wheel axle 34b. The ends of the first axis roller 14 lay on roller shaft supports 32c and 32b.

A second axis roller 18 uses axles 34a and 34b as a roller shaft support. The roller shaft supports 32 and the encoder wheel axles 34 are preferably made of flexible material which makes snapfit assembly of the first and the second axis rollers 14 and 18 possible.

The first and the second axis rollers 14 and 18 are connected to the encoder wheels by gears 36a and 36b. The gears 36a and 36b can be toothed wheels having counterparts on encoder wheels 30 or they can be made of a rubber material, which provides a good nonslippery touch.

In order to save space and to provide a flat device, the encoder wheels 30 are lying flat on the circuit board 28 under the axis rollers 14 and 18. A plurality of holes 42 are formed along the circumference of both encoder wheel 30a and 30b. When user rotates the axis rollers 14 and 18 by a finger, the gears 36a and 36b transform the rotation to encoder wheels 30a and 30b. A light emitting element 38, preferably a light-emitting diode is positioned on a first side of both encoder wheels 30a and 30b. A light detecting element 40, preferably a phototransistor is positioned on the second side of the wheel opposite of each LED 38. As a encoder wheels 30 rotates, light from the LEDs 38 is alternatively blocked and transmitted through the encoder wheel 30 and received by the phototransistor 40 depending on whether one of the holes 42 allows the light go through the encoder wheel 30. Different methods to determine the direction of the rotation of the wheel can be employed.

Instead of using a wheel as encoder, other type of motion-to-electrical traducer can also be used.

A first end of the circuit board 28 is connected to the housing 10 allowing slight downward movement of the opposite end of the circuit board 28. A spring biased first select switch 44 is connected in the second end of the circuit board 28. Pressure against the axis rollers 14 or 18 causes the second end of circuit board 28 bend down. This causes actuation of the switch 44.

An additional select switch 48 is placed on the side of the circuit board 28 under the press button 20. Convenient location of the button 20 gives user an alternative way to make selections.

A additional circuitry 50 among the others mentioned is mounted on same circuit board 28. The additional circuitry 50 includes a microcontroller and other discrete electronic devices known by those skilled in the art to cause the light emitting elements 38 to emit light, to cause the light detecting elements 40 to produce signals based on the light, to receive signals, and to convert these signals to appropriate computer signals to be output over the cord 22 (FIG. 1) or through transmitter (not shown) to the computer or intelligent TV.

FIG. 3 shows a cross sectional view 100–101 of the input device. To make rotating easier the encoder wheels 30a and 30b lay on ball bearings 52. The first select switch 44 goes through the circuit board 28 against the housing 10. When user pushes the axis rollers 14 and 18 the spring 46 compresses and the adjacent end of the circuit board 28 bends down. The sensor actuates the select switch 44. When the axis rollers 14 and 18 are released the spring 46 pushes the circuit board to its biased position.

Figure 13A:
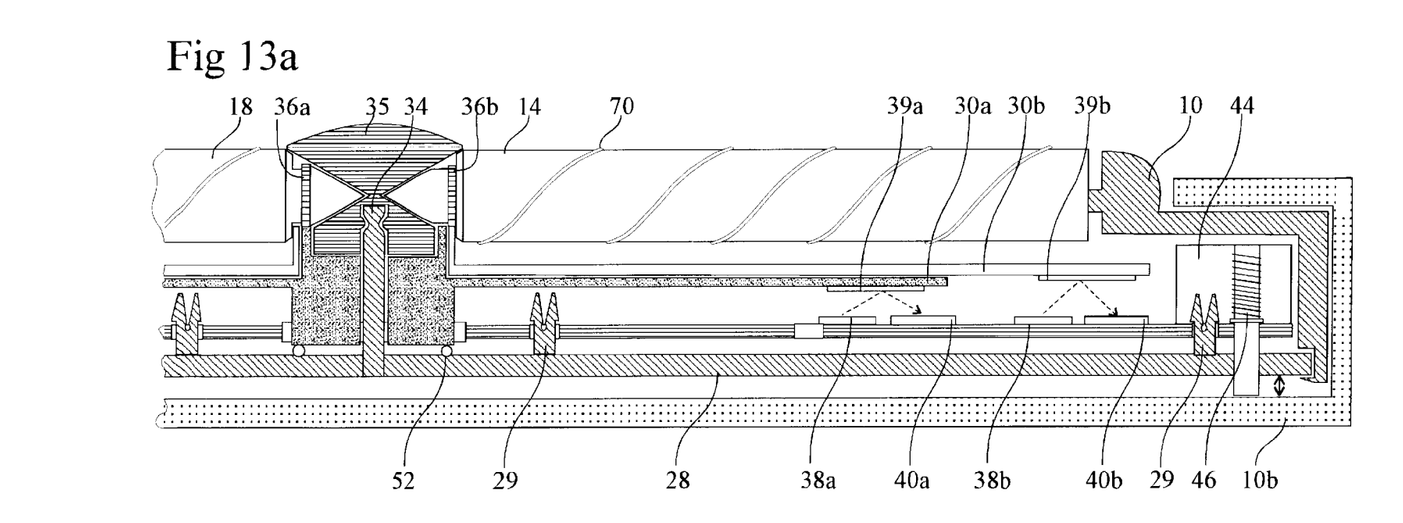
FIG. 13a shows partial cross sectional view of a input device with lateral encoder wheels with common axle and light reflecting elements.

FIG. 13a shows partial cross sectional view of a input device with lateral encoder wheels sharing a common axle and having light reflecting elements on outer periphery of the encoder wheels. The axis rollers 14 and 18 have a structured surface 70 with treads or grooves for better touch.

The rotational movement of the first axis roller 14 is transformed to the encoder wheel 30b through the gear 36b. The gear 36b of the first axis roller 14 interfaces the inner core of the encoder wheel 30b having teeth on upper surface. When the axis roller 14 is rotated the encoder wheel 30b rotates around the axle 34. The second axis roller 18 is connected to encoder wheel 30a though the gear 36a respectively.

The encoder wheels 30a and 30b have a plurality of light reflecting elements 39a and 39b on its outer periphery. The LED lights 38a and 38b are mounted on circuit board 28 illuminating light up to the light reflecting elements 39. Phototransistors 40a and 40b are mounted face up on circuit board 28 to receive the reflected light from light reflecting elements 39.

Figure 13B:
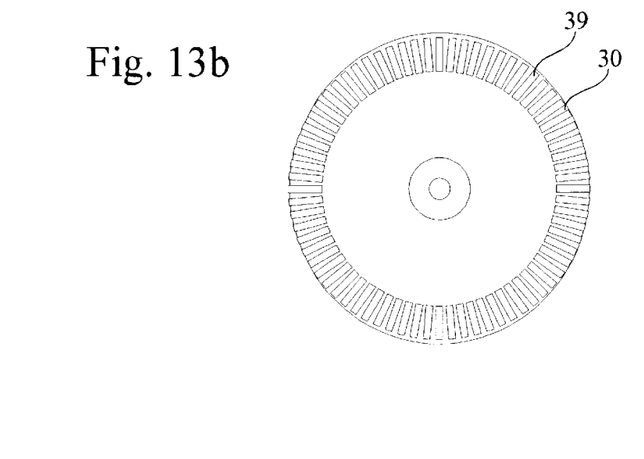
FIG. 13b shows a encoder wheel with light reflecting elements.

FIG. 13b shows an encoder wheel 30 with a plurality of light reflecting elements 39.

Description of the Second Embodiment

Figure 4:
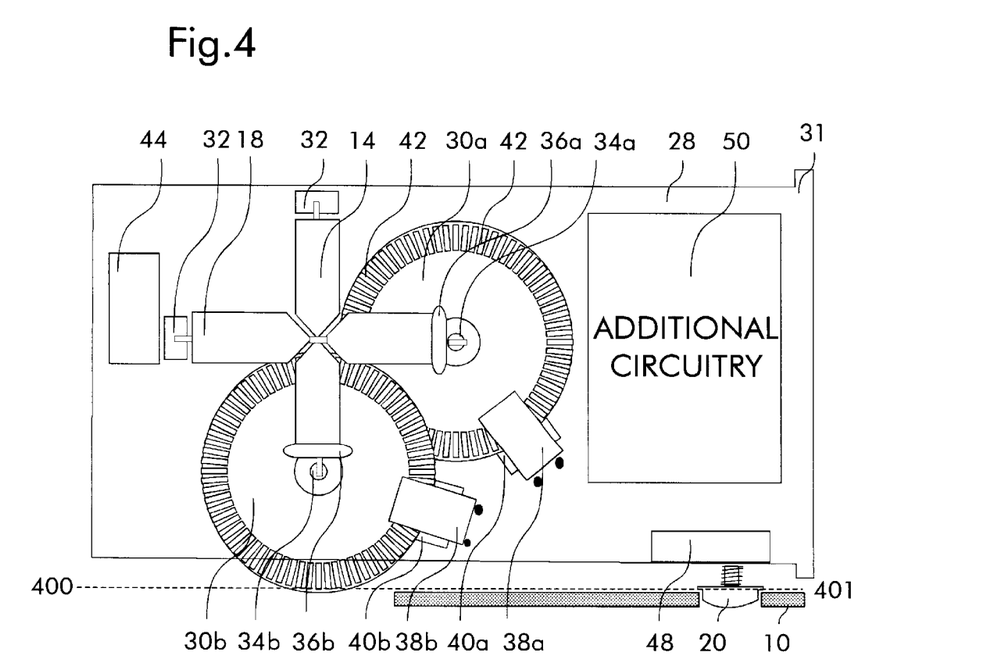
FIG. 4 shows a top cross sectional view of input device with X-type crossing rollers.

FIG. 4 shows a dual-touch roller cursor mark pointing device with X-type crossing rollers. In this embodiment the axis rollers 14 and 18 have wide touch area which come to a point at center to cross each other.

Placing the axis rollers 14 and 18 in cross shape makes it easier to move both of the axis rollers simultaneously either way by pushing upward by straightening the thumb or dragging by pulling the thumb inward. This motion moves the cursor diagonally across the screen with the cursor. Depending on the angle of the thumb movement user can adjust the roller ratio and moving angle of the cursor.

The overlaying axis roller 18 is in higher position than underlying axis roller 14. In order to make the device easier to use it would be practical to make the overlaying axis roller touch area thinner than the other axis roller. Particularly, the touch areas should preferably be on the same level.

When the other axis roller is thinner it rotates faster than the other with bigger diagonal. Signal ratio can be adjusted on same level by changing the gear 36, adjusting the holes 42 or by manipulating the program.

In order to save space the encoder wheels 30 lay partially one over the other. This makes it possible to make the circuit hoard 28 shorter. The function of the other parts shown in FIG. 4 are equal to FIG. 2.

Figure 5:
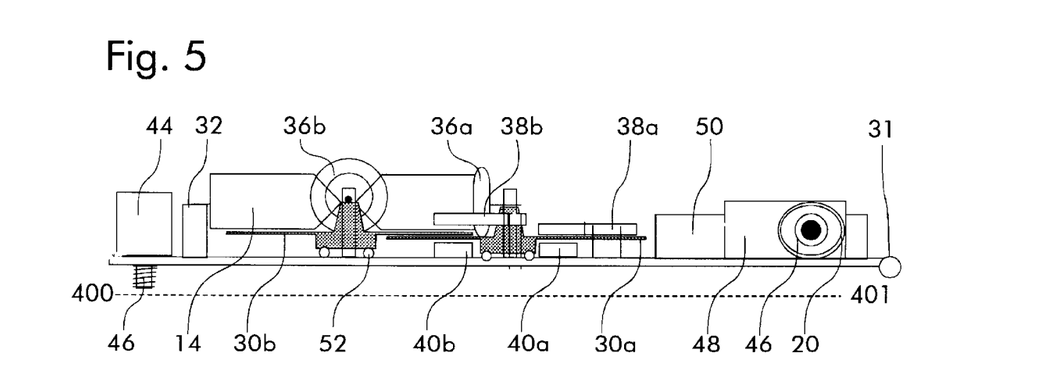
FIG. 5 shows a side cross sectional view of FIG. 4.

FIG. 5 shows a side cross sectional view 400–401 of input device of FIG. 4. In this picture ball bearings 52 can be seen. The ball bearings 52 makes the encoder wheels 30 move smoothly.

Description of the Third Embodiment

Figure 6:
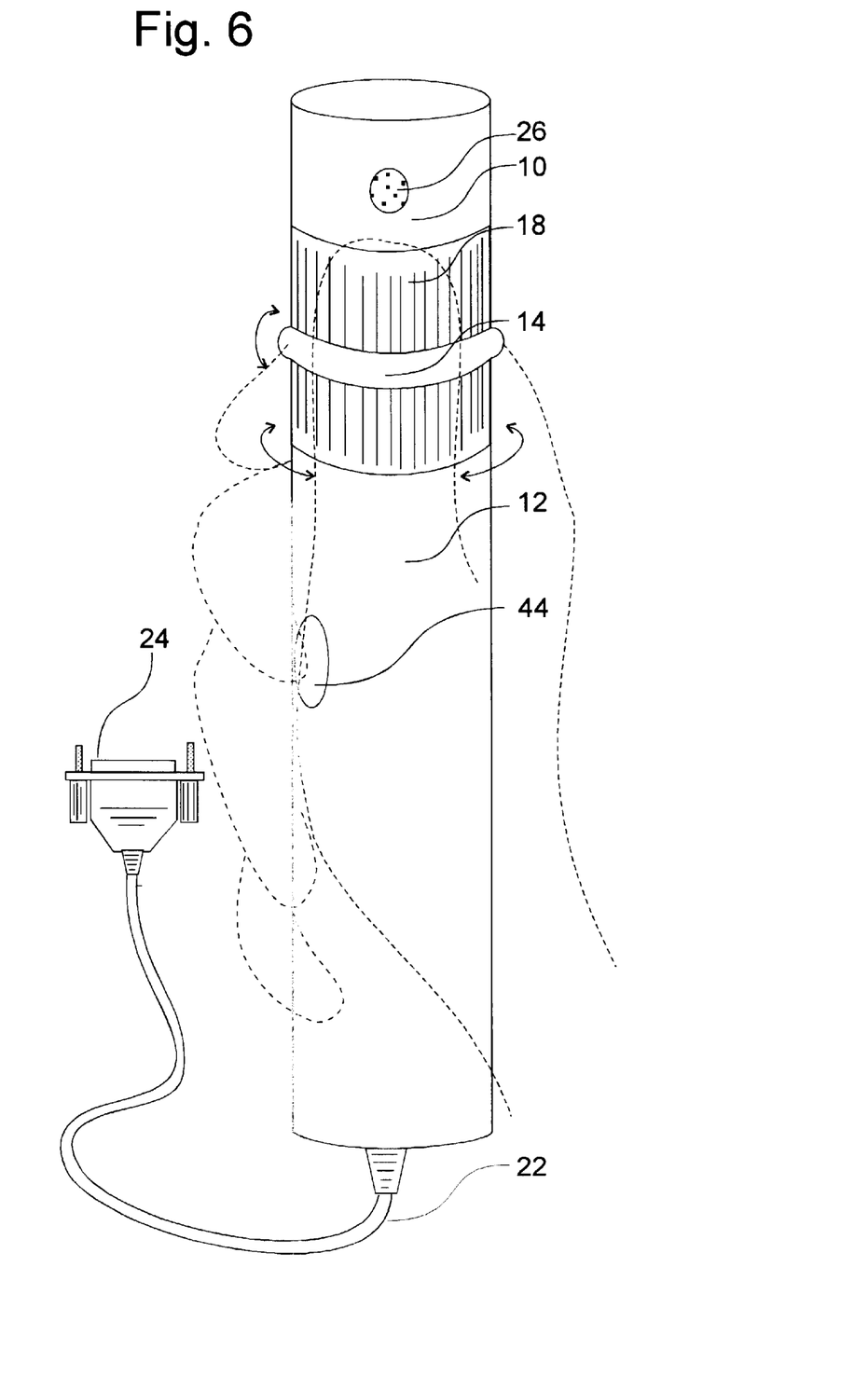
FIG. 6 shows a perspective view of a input device with integrated rollers.

FIG. 6 shows a perspective view of a input device with integrated rollers. The second axis roller 18 rotates around housing 10 which is a axle of the second axis roller 18.

Figure 7:
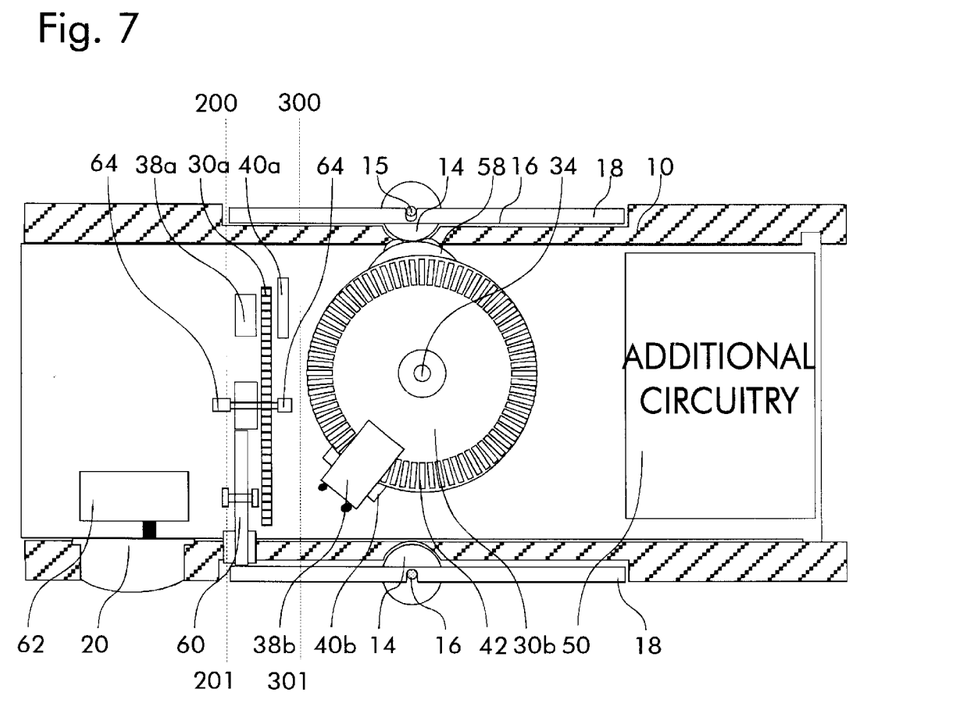
FIG. 7 shows a top cross sectional view of a input device with integrated rollers.

FIG. 7 shows a top cross sectional view of a input device with integrated rollers. Second axis roller 18 supports the axle 16 of the first axis roller 14 from multiple points around the outer periphery of the second axis roller 18. The first axis roller 14 have a plurality of gear teeth on it's outer periphery. The teeth connect the second axis roller to the gear 58 through the openings of the roller 18. The gear 58 transforms the rotational movement of the first axis roller 14 to the encoder wheel 30b. The encoder wheel 30b functions in the same manner as in first embodiment.

Figure 8:
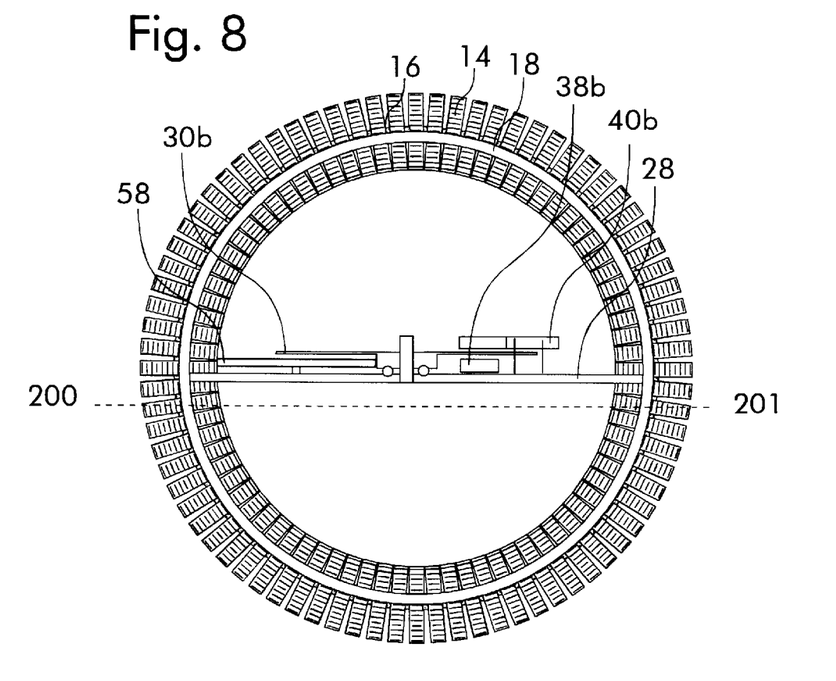
FIG. 8 shows a cross sectional view of a input device with integrated rollers, showing the second encoder wheel laying parallel to the circuit board.

FIG. 8 shows the first axis roller 14 forming a annular ring around the second axis roller 18. The first axis roller 14 and axle 16 is made out of a flexible and durable material like nylon. Flexible axle 16 allows the rotation of the first axis roller 14. When user holds the long shaft comfortably in hand against the palm he/she can rotate both rollers simultaneously with one thumb movement. Rotation can be helped by index finger from opposite side of the housing.

Figure 9:
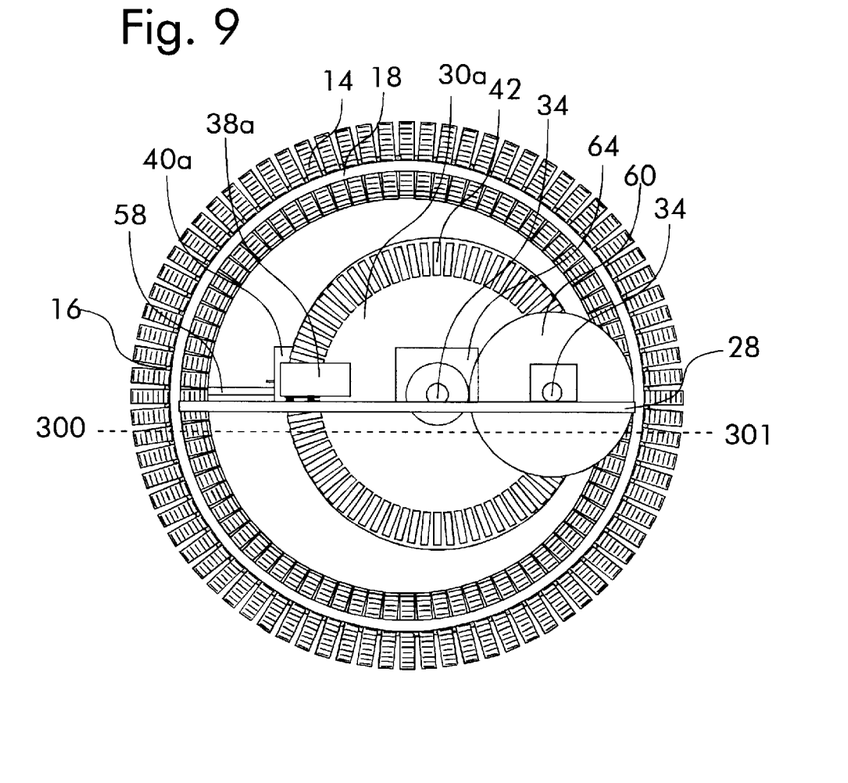
FIG. 9 shows a cross sectional view of a input device with integrated rollers, showing the first encoder wheel laying perpetual position to the circuit board.

In FIG. 9 the encoder wheel 30a is embedded in the circuit board 28 so that the axle 34 of the encoder wheel 30a lays on the axle support 64. The encoder wheel 30a is perpendicular to the circuit board 28, partly going through the circuit board 28. The encoder wheel 30a is connected to the second dimensional roller 18 by a gear 60. When user rotates the second axis roller 18 by his thumb or index finger, the gear 60 transforms the movement to the encoder wheel 30a.

Description of the Fourth Embodiment

Figure 10A:
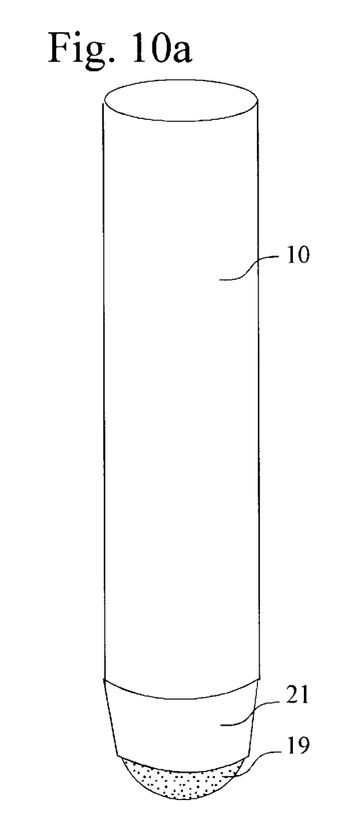
FIG. 10a shows a perspective view of a roller stick type input device.

A roller stick type pointing device is disclosed as part of further embodiment of the input device. Input device is comprised of a ball 19 embedded in the lower end of longitudinal, preferably round housing 10. The shaft of the housing is formed so that is can be held in hand between fingers. The size and thickness of the shaft comfortably fits to users hand when the roller is rotated against surface, which can be a table, users lap or the other hand etc.

Figure 10B:
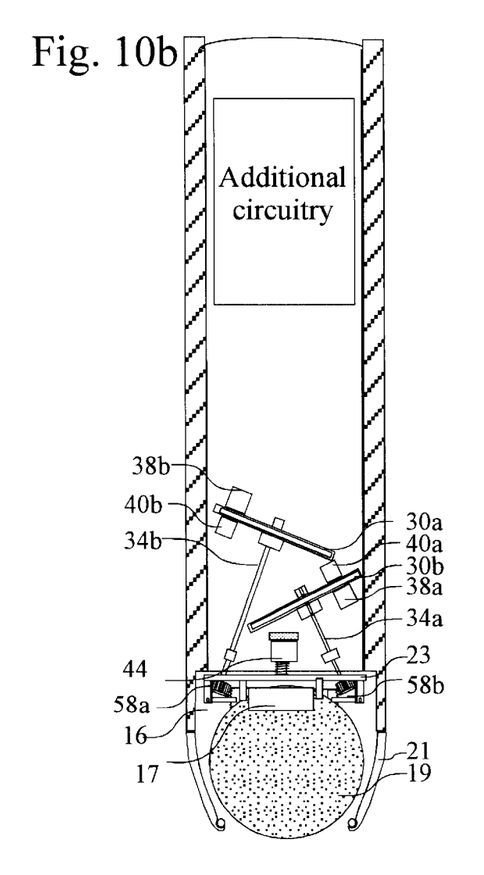
FIG. 10b shows a cross sectional view of a roller stick type pointing device.

Roller stick mouse has a ball 19 ratably fixed to the lower end of an elongated shaft 10. The ball 19 is kept in it's position by a collar 21. When a user moves the ball against lap, table top or hand, the ball 19 rotates against axis rollers 14 and 18 and support roller 17.

The axis rollers 14 and 18 are connected to encoder wheels by gears 58a and 58b and axles 34a and 34b. The teeth of the gears 58a and 58b interface the encoder wheels 14 and 18.

Figure 10C:
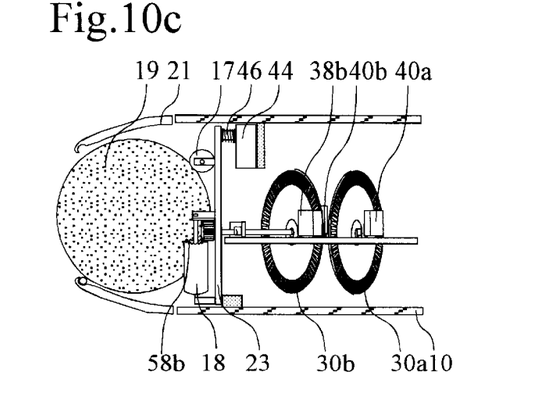
FIG. 10c shows a partial cross sectional view of a roller stick type input device.
Figure 10D:
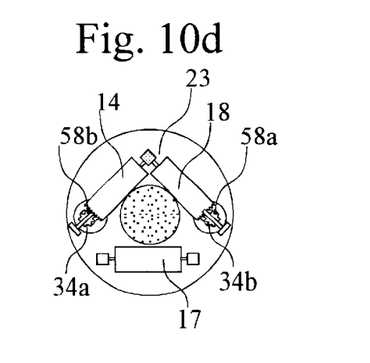
FIG. 10d shows a down view of the roller bed of a roller stick type input device.

The roller bed 23 is flexibly connected to the housing 10 with a hinge or other means. The opposite end of the roller bed 23 can be moved slightly in towards the circuit board. A spring biased first select switch 44 is connected in the movable end of the roller bed 23. Pressure from the ball 19 against the axis rollers 14 and 18 causes the movable end of circuit board 28 to bend down. This causes actuation of the selection switch 44.

Description of the Fifth Embodiment

Figure 11A:
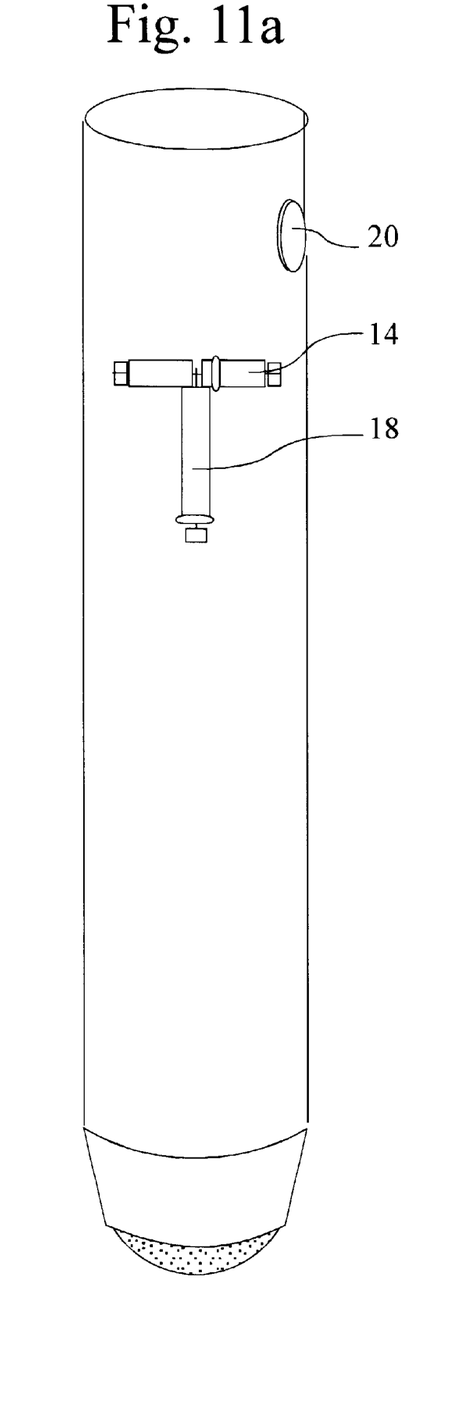
FIG. 11a shows a perspective view of a single touch input device and a roller stick type pointing device combination.
Figure 11B:
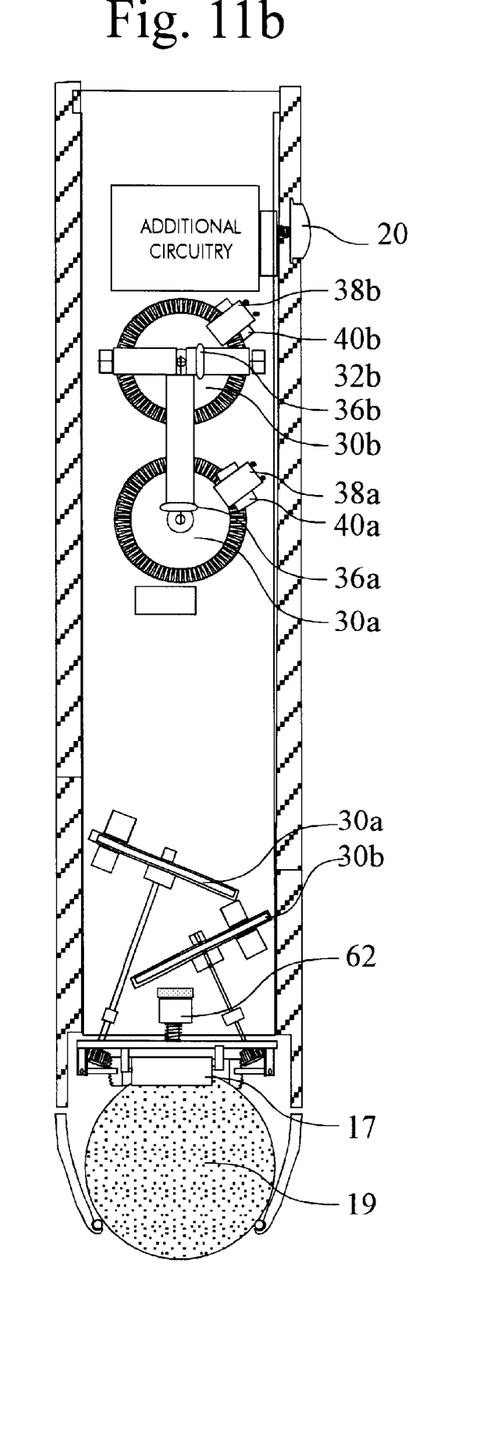
FIG. 11b shows a cross sectional view of a single touch input device and a roller stick type pointing device combination.

FIG. 11a and 11b show a perspective and a cross sectional view of a combination of input device with rollers and a roller stick type pointing device. Combined device is able to produce four access signals. Connections are explained with reference to FIGS. 7–10d.

Rollers 14 and 18 can be used for example to move cursor horizontally and vertically on screen. Simultaneously roller stick with a ball 19 device can be used to e.g. roll page sideways and lengthwise.

In computer games roller device can be used to point e.g. a target point and roller stick device is used to move forward, backward and sideways in a space. Depending on game program, target point can be locked towards, a target while moving in space with roller stick.

Additional slidable or rotational height adjuster (not shown) can be provided to adjust a viewpoint of a user. By using a height adjuster user can hide behind objects or look over high objects. In, for example, architectural applications one can customize viewing height based on the height of a viewer.

First switch button should preferably be connected with the rollers so that selections can be made easily. Second select button is connected to roller stick device being actuated by pressure against the ball.

SUMMARY, RAMIFICATIONS, AND SCOPE

Roller input device can be made small with superior connection and accuracy. The cursor stops immediately when user stops moving finger. Operation is effective and fast. Because of the sensitivity of the human fingertip even finest cursor movements are possible. Both rollers can be moved by one finger at the same time. Additionally user can move cursor only in horizontal or vertical position if desired. By moving only one roller, straight vertical and horizontal movements can be made.

This feature is extremely valuable for users using graphical drawing programs and computer aided design programs. Device can be also be used to scroll horizontal and vertical side bars. This can be made by dedicating a button to change the function.

To select objects the device would have a select button. Select button can be connected to an axis roller or roller support where user can select the feature as soon as cursor is over desired area. Selection can be made without lifting a finger from the rollers.

The small device size makes it possible to have the device beside the display on a handheld. PC, lap top computer or on the side of a computer keyboard. Dual touch roller mouse can also be a stand alone device attached to the side of a standard keyboard by pressure sensitive double sided tape or other means.

Figure 12A:
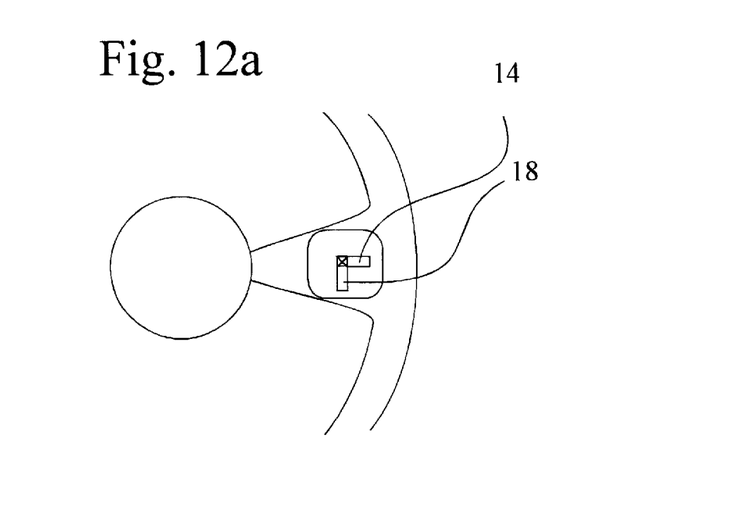
FIG. 12a shows a input device with crossing rollers embedded to car's steering wheel.

In. FIG. 12a application the device is embedded in a spoke of a steering wheel of a car. There the pointing device is easily accessible for driver. Selecting desired function from tree type select menu is easy. Driver can roll display select menu sideways by rolling the second dimension roller and up and down with the first dimension roller. Driver can use device in connection with microprocessor to select between different programs like CD, radio, traffic information, navigation, air-conditioning and to select telephone numbers and initiate phone calls.

Figure 12B:
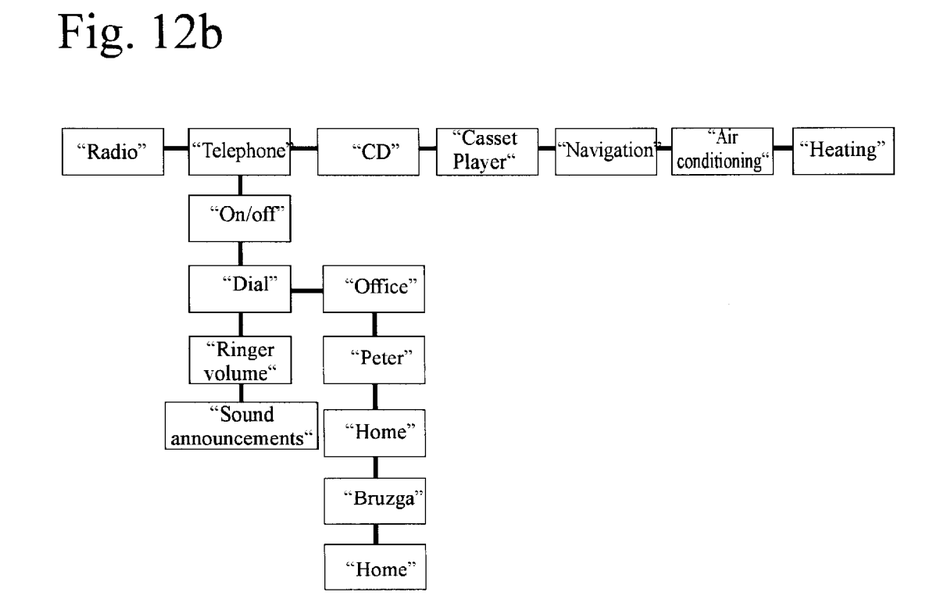
FIG. 12b shows a tree type selection menu with sound announcement.

FIG. 12b shows a tree type selection menu with sound announcement. Main select options are shown on upper row. Operational functions with their branches are show on drop down menus.

User can move either one of the axis rollers independently. In order to move sideways on menu user moves the second axis roller 18. Microcontroller (not shown) is connected to a synthesizer or a memory announcing the name of the icon cursor is on. When cursor is over highlighted area instead of looking for information on the display, driver hears announcements "Radio" . . . "Telephone" . . . "CD" . . . etc,. User makes selections by pressing the axis rollers and actuating the selection switch when cursor is over desired area without taking eyes off the road or hands off the wheel.

After selecting from the main menu user moves the first axis roller 14 and hears the select options and selects options the same way as in main menu.

Alternatively the options can be selected from visual display located in front of the driver. Placing the pointing device in steering wheel keeps drivers hands on steering wheel at all time.

Invention also discloses a microphone as a part of handheld pointing device. Pointing devise with microphone has several uses. Lecturer can browse computer files, point figures on screen and simultaneously speak to public through loudspeakers by using the microphone in the device.

The microphone is especially useful when it is used in connection with speech recognizing program or dictating programs. User is not dependent on flat operational surface. User can hold input device in hand, move cursor by finger to desired point, lock cursor to desired point, and speak to the microphone. Dictating program catches the speech and types it on the screen.

Additionally the roller stick input device can be used as a stand alone device, intention of this combined invention is to provide three and four dimensional pointing devise e.g. for games and architectural applications.

The roller stick pointing device gives two additional dimensions for a roller input device.

While dual-touch roller pointing device provides an easy way to move cursor on the screen and make selections, roller stick can simultaneously be used against users lap, other hand, a table top or other surface to move the page vertically and horizontally.

This invention makes side bars unnecessary in some applications and gives more visual area for screen images.

Roller stick can be used to move forward and sideways in space. This feature is useful for example in architectural applications where user goes inside a house or and browses the rooms etc.

A roller input devise can be used as TV remote control or intelligent TV input device (not shown). A selection button connected to the roller device can be used to first display and activate a select menu on the screen. A user makes selections by moving the rollers and pressing them when cursor is over a desired function area. Pressing same function twice inactivates select menu. Second click over same function makes select menu disappear.

The cursor displayed on the display device is under remote control transmitter. The remote control is provided with, for example, a light emitting element emitting light rays having a particular wavelength, for example, infrared rays.

Figure 14A:
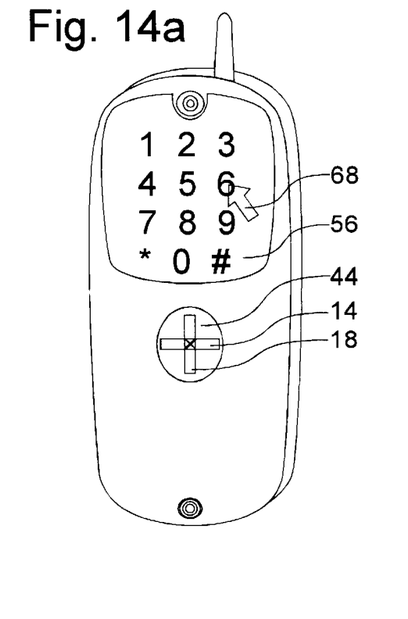
FIG. 14a shows an input device embedded to a telephone handset with graphical display.
Figure 14B:
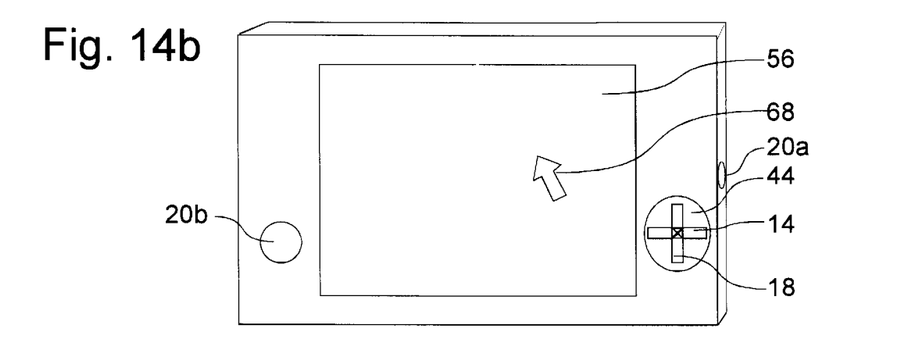
FIG. 14b shows an input device embedded to a hand held computer.
Figure 14C:
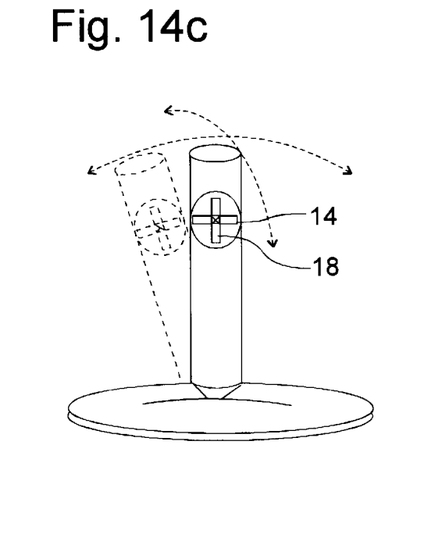
FIG. 14c shows an input device embedded to a joystick.
Figure 14D:
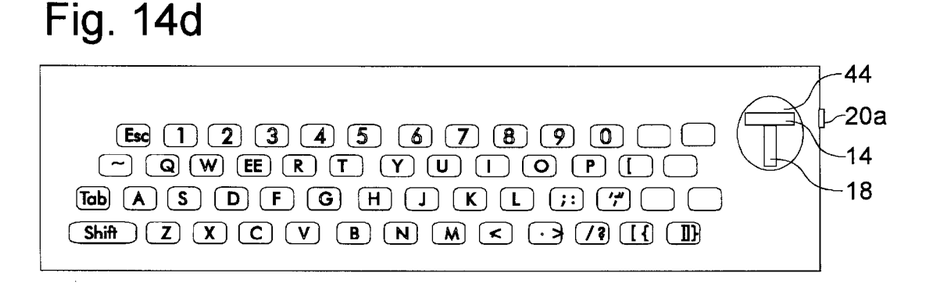
FIG. 14d shows an input device embedded to a keyboard.

In FIG. 14d the input device is embedded to the side of a handheld computer display. The input device is facing the user. The first select switch 44 is connected to the rollers. User can move the cursor by rotating the rollers by finger and select options by pressing the switch. Optional second select buttons 20a and 20b are also provided to produce second switch signal.

Select buttons 44 and 20, functioning standard Microsoft (TM) right and left button can also be mounted to the side of the laptop's or handheld PC's keyboard or display housing or to the back side of the housing of the keyboard or display.

As shown in FIG. 14a roller input device can also be embedded into a portable cellular telephone to be used as a cursor control and a selecting means for telephone display. Roller input device with graphical display unit can replace conventional keyboard and make a telephone easier to use. User browses the select options with axis rollers 14 and 18 and selecting them by switch 44.

Different telephone functions are easier to select from tree-type selection menu than by using conventional keyboard functions. Graphical interface can be used without earlier experience or a manual. User makes dial selections by moving the cursor on display and pressing the rollers when cursor is over desired numbers.

Display can also have other selections, like alphabet for telephone book in memory. By rotating the rollers he/she can roll the display selections and by pressing the rollers user can make dial selections.

Multiple selection can be made without lifting the finger from select button. User is able to hold the telephone and keep it securely in hand between the thumb and other fingers during the selections.

Input device can alternatively be embedded to a joystick (FIG. 14c) to provide a thumb operated pointing device e.g. to move a cursor and point a target.

We claim:

1. A finger actuated display interface input device comprising:
   (a) a housing;
   (b) a first elongated axis roller mounted on the surface of the housing, parallel to the housing, with substantially its entire manipulable length being small enough to fit under a thumb of a human for inputting positional information for a first axis;
   (c) a first transducer coupled to said first axis roller for producing a first signal indicative of the rotation of said first axis roller;
   (d) a second, elongated axis roller mounted on the surface of the housing, parallel to the housing, with substantially its entire manipulable length being small enough to fit under a thumb of a human for inputting positional information for a second axis;
   (e) a second transducer coupled to said second axis roller producing a second signal indicative of the rotation of said second axis roller;
   (f) at least one switch adapted to produce at least one switch signal upon actuation of said switch by pressure from a user's finger;
   (g) said first axis roller and said second axis roller being selectively rotatable for selectively inputting positional information for the first axis or for the second axis respectively; and
   (h) said first axis roller and said second axis roller being located so close to each other that both axis rollers can be rotated simultaneously by a touch of a finger pad of a distal phalanx of one finger to simultaneously change positional information in said first and second axes;
   (i) said first axis roller and second axis roller being operable whether or not the housing is placed on a planar working surface.

2. The input device of claim 1 having a second switch adapted to produce a second switch signal upon actuation of said second switch by a downward.

3. The input device of claim 1 wherein said device is so constructed that pressure against one or both of the rollers and downward movement of at least one of the rollers or downward movement of a roller bed relative to the housing causes actuation of at least one said switch.

4. The input device of claim 1 wherein said input device is a computer mouse independent from a stationary surface being able to hold in user's hand between fingers.

5. The input device of claim 4 further comprising a microphone able to receive audio speech from a user's mouth and converting it to audio speech signal and forwarding it to a host computer.

6. The input device of claim 1 wherein said housing is a portable computer.

7. The input device of claim 1 wherein said housing is a portable telephone and said first and second axis rollers are coupled to move cursor on telephone display.

8. The input device of claim 1 wherein said housing is a TV remote control and said first and second axis rollers are coupled to move cursor on TV display.

9. The input device of claim 1 wherein said housing is a computer keyboard.

10. The input device of claim 1 wherein said housing can be mounted to a spoke of a steering wheel to control at least a microcontroller based device.

11. The input device of claim 1 embedded to a handheld joystick.

12. The input device of claim 1 wherein the thickness of said first and second axis rollers differentiate.

13. The input device of claim 1 wherein said rollers have structured surface elements.

14. The input device of claim 13, wherein said structured surface elements are grooves.

15. The input device of claim 12 wherein said structured surface elements are threads.

16. A finger actuated display interface input device, independent from planar working surface comprising:
   (a) a housing;
   (b) only one elongated axis roller, said axis roller being sufficiently small enough to fit under a finger pad of a distal phalanx of one finger of a human being for inputting positional information for a first axis;
   (c) a transducer coupled to said axis roller for producing a signal indicative of the rotation of said axis roller;
   (d) at least one switch adapted to produce at least a one switch signal upon actuation of said switch by pressure from a user's finger against said axis roller, and downward movement of said axis roller or downward movement of a roller bed relative to the housing causes actuation of said switch;
   (e) said axis roller being selectively rotatable for selectively inputting positional information for the first axis;
   (f) said axis roller being disposed to the surface of the housing, parallel to the housing and said axis roller being rotatable by a touch of one finger to simultaneously change positional information and make selections without lifting a finger from said axis roller.

17. The input device of claim 1 wherein the switch functions are selectable from a group of following standard mouse functions; click, double-click, press and rotate, select by pressing rotating and releasing, and drag and drop.

18. The input device of claim 16 wherein the switch functions are selectable from a group of following standard mouse functions; click, double-click, press and rotate, select by pressing rotating and releasing, and drag and drop.

19. The input device of claim 1 wherein said first axis roller and said second axis roller are arranged one overlying the other so as to form an X-shape when viewed from a perspective that is orthogonal to both a main longitudinal axis of said first axis roller and a main longitudinal axis of said second axis roller.

20. The input device of claim 1 wherein said first axis roller and said second axis roller are arranged together so as to form an T-shape when viewed from a perspective that is orthogonal to both a main longitudinal axis of said first axis roller and a main longitudinal axis of said second axis roller.

21. The input device of claim 1 wherein said first axis roller and said second axis roller are arranged together so as to form an L-shape when viewed from a perspective that is orthogonal to both a main longitudinal axis of said first axis roller and a main longitudinal axis of said second axis roller.

* * * * *